US012651547B2

(12) United States Patent
Omholt

(10) Patent No.: US 12,651,547 B2
(45) Date of Patent: Jun. 9, 2026

(54) COLOR CALIBRATION OF A DESKTOP MONITOR USING A MOBILE DEVICE CAMERA

(71) Applicant: Seboya LP, Novato, CA (US)

(72) Inventor: Clark A. Omholt, Novato, CA (US)

( * ) Notice: Subject to any disclaimer, the term of this patent is extended or adjusted under 35 U.S.C. 154(b) by 90 days.

Patent file contains an affidavit/declaration under 37 CFR 1.130(b).

(21) Appl. No.: 18/661,699

(22) Filed: May 12, 2024

(65) Prior Publication Data

US 2025/0148952 A1 May 8, 2025

Related U.S. Application Data

(60) Provisional application No. 63/509,269, filed on Jun. 20, 2023.

(51) Int. Cl.
*G09G 3/20* (2006.01)
*G06T 7/90* (2017.01)

(52) U.S. Cl.
CPC ............. *G09G 3/2003* (2013.01); *G06T 7/90* (2017.01); *G06T 2207/10024* (2013.01); *G09G 2320/0606* (2013.01); *G09G 2320/0666* (2013.01); *G09G 2320/0693* (2013.01); *G09G 2354/00* (2013.01); *G09G 2370/02* (2013.01)

(58) Field of Classification Search
None
See application file for complete search history.

(56) References Cited

U.S. PATENT DOCUMENTS 10,205,940 B1 * 2/2019 Baldwin .............. H04N 1/6052
2009/0021587 A1 * 1/2009 Snyderman .............. H04N 9/73
348/207.11

(Continued)

FOREIGN PATENT DOCUMENTS

EP 4451250 A1 10/2024

OTHER PUBLICATIONS

Truhu, "YouTube—TruHu Intro Feb. 2023", https://www.youtube.com/watch?v=eOjZvGPWF_Q, Feb. 3, 2023, 5 pages.

*Primary Examiner* — Hilina K Demeter
(74) *Attorney, Agent, or Firm* — Outside General Counsel, LLP; Alexander Franco

(57) ABSTRACT

A desktop monitor calibration system uses a smartphone's camera as a color measurement device for a computer's desktop monitor via a network connection between the smartphone and the computer. The system can be configured to leverage a determined metamerism correction profile between individual displays (e.g. brand and model or backlight technology) and individual camera sensors (e.g. device brand and model, or image capture device technology, or brand and model). The metamerism correction profile for each combination of display and camera can be determined by testing and addresses metameric failure for the particular combination. For each calibration instance, the display and camera sensor are each identified, an associated metamerism correction profile is then retrieved from a metamerism correction matrix (MCM), and the metamerism correction profile is used to account for the particular combination of the camera and display when creating an ICC profile for installation on the display's computer.

3 Claims, 15 Drawing Sheets

(56)                    References Cited

U.S. PATENT DOCUMENTS

| | | | |
|---|---|---|---|
| 2010/0156045 A1* | 6/2010 | Kahn | A63F 3/0423 |
| | | | 463/9 |
| 2010/0188418 A1* | 7/2010 | Sakai | G01J 1/4204 |
| | | | 345/589 |
| 2013/0027421 A1* | 1/2013 | Bala | G09G 5/02 |
| | | | 345/594 |
| 2013/0050504 A1* | 2/2013 | Safaee-Rad | G09G 5/02 |
| | | | 348/181 |
| 2014/0136964 A1* | 5/2014 | James | G09G 5/02 |
| | | | 715/255 |
| 2015/0221078 A1* | 8/2015 | Kim | G09G 3/006 |
| | | | 345/1.3 |
| 2017/0140556 A1* | 5/2017 | Safaee-Rad | G06T 11/10 |
| 2020/0357360 A1* | 11/2020 | Marcu | G09G 5/02 |
| 2021/0097955 A1* | 4/2021 | Nicholson | G01J 3/0202 |
| 2022/0086409 A1* | 3/2022 | Park | G01J 3/524 |
| 2023/0007211 A1* | 1/2023 | Suzuki | G06F 3/14 |
| 2023/0239553 A1* | 7/2023 | Galor Gluskin | H04N 9/646 |
| | | | 348/164 |
| 2024/0331604 A1* | 10/2024 | Barber | G09G 3/2003 |

* cited by examiner

2:16

TRUHŪ

Welcome to TruHu!

Truhu uses your smartphone's camera to calibrate your computer's screen for color accuracy.

Have the Desktop app?

You will need the Desktop app to begin calibration.
truhu.app/downloads

Next

2:16     .ᵢ𝄐 📶 🔋

〈 Back

Adjust Ambient Lighting

Before starting the calibration process,
please adjust the ambient lighting to
reduce the light falling on the screen.

Learn how to adjust ambient lighting

Next

2:16

< Back

Set Brightness

Make sure your display's brightness is
adjusted for good viewing in your ambient
lighting environment.

Learn how to set your display's brightness

Next

2:16

Capture Gray

Next point your smartphone camera at the
gray pattern displayed on TruHu desktop
until the yellow rectangle and green square
line up.
Then capture the image.

Next

2:18

< Back

Capture Color

Next point your smartphone camera at the
color pattern displayed on TruHu desktop
until the yellow rectangle and green square
line up.
Then capture the image.

Next

2:19                                          .ıll 🛜 ▬

< Back

Measurement Complete

Click "Done" to proceed and return to the
Desktop App.

Done

COLOR CALIBRATION OF A DESKTOP MONITOR USING A MOBILE DEVICE CAMERA

RELATED APPLICATIONS

The subject matter of this application is related to U.S. Provisional Application No. 63/509,269, filed on 2023 Jun. 20, which is hereby incorporated by reference in its entirety.

BACKGROUND OF THE INVENTION

Color calibration of computer monitors has been historically performed with dedicated colorimeter devices. Such devices are cost prohibitively expensive for the casual user and are generally used only by professional users with a critical need for accurate color representation on their computer monitors.

SUMMARY OF THE INVENTION

A desktop monitor calibration system uses a smartphone's camera as a color measurement device. Uniquely, it makes use of a paired sensor (e.g., iPhone 12) and backlight (e.g., WLED) camera profile to convert RAW sensor data to colorimetric (XYZ) data required to create a monitor profile that enables color-accurate viewing for applications like photography and design.

In one embodiment, the system includes a desktop app and a mobile app which communicate with each other via web socket. A calibration procedure is executed in which the user points the iPhone at the computer screen. It is then used to capture RAW images that get uploaded to the cloud for calculations related to color temperature, tonality, and chromaticities (e.g. 6500 Kelvin, gamma 2.2, sRGB). An International Color Consortium (ICC) profile is then created for the user's computer and installed in order to affect the monitor calibration.

In one embodiment, the system can be configured to support in combination: any camera able to generate RAW sensor data (e.g. any modern mobile device, such as an iPhone 7 or later); and any computer with the ability to incorporate a monitor profile (such as an ICC profile, e.g. an Apple Macintosh running MacOS).

A method is performed by a system including a desktop computer with a display and a mobile device with a camera. The method includes: establishing a network connection between a mobile device application executing on the mobile device and a desktop application executing on the desktop computer; identifying a display feature of the display comprising a backlight technology or display model; identifying a camera feature of the camera comprising a camera model or a mobile device model; retrieving a metamerism correction profile based on the display feature and the camera feature; the mobile device using the camera to capture one or more images of one or more test patterns displayed on the display; and performing a monitor profiling process to adjust color calibration of the display based on the metamerism correction profile and the captured images. The one or more images can be captured in RAW format. The monitor profiling process can include: adjusting a white point or color temperature setting; adjusting a tonal reproduction curve; and installing an ICC monitor profile. The white point or color temperature setting can be further based on user input.

As will be appreciated by one skilled in the art, multiple aspects described in this summary can be variously combined in different operable embodiments. All such operable combinations, though they may not be explicitly set forth in the interest of efficiency, are specifically contemplated by this disclosure.

DETAILED DESCRIPTION

Figure 1A:
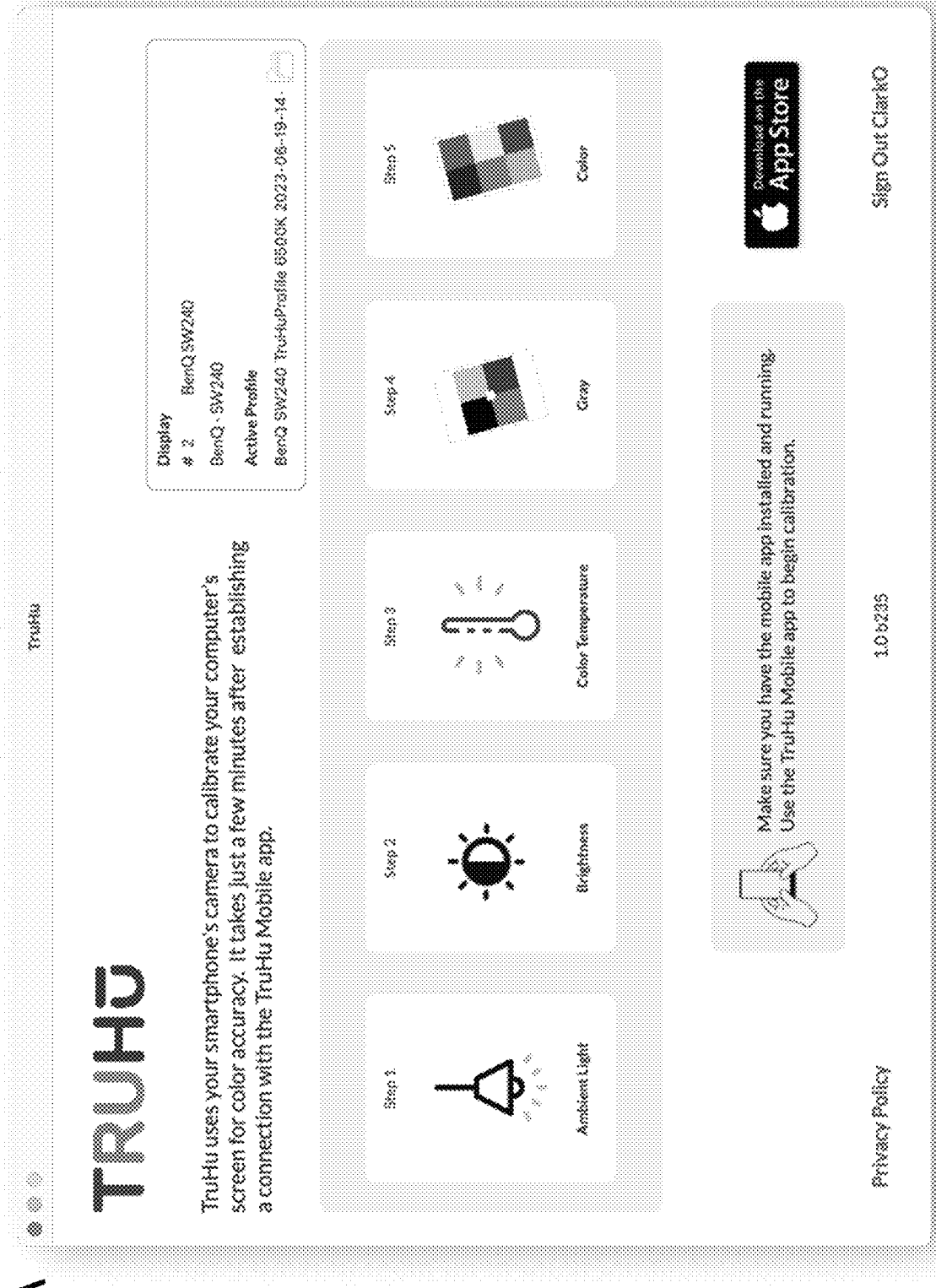
FIGS. 1A-E illustrate screen captures of a desktop application executing on a desktop computer showing a user experience during a desktop monitor color calibration process.
Figure 1B:
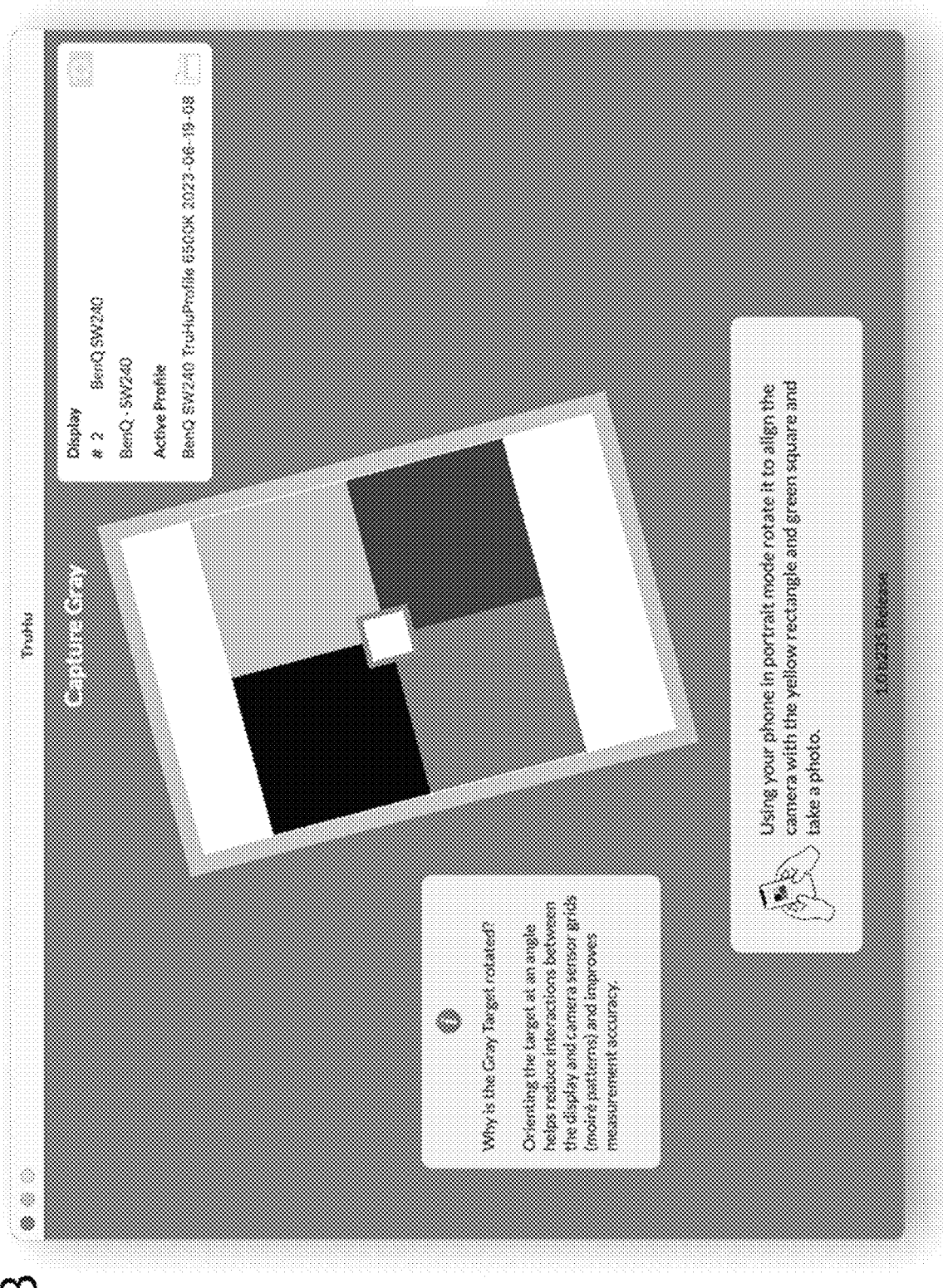
Figure 1C:
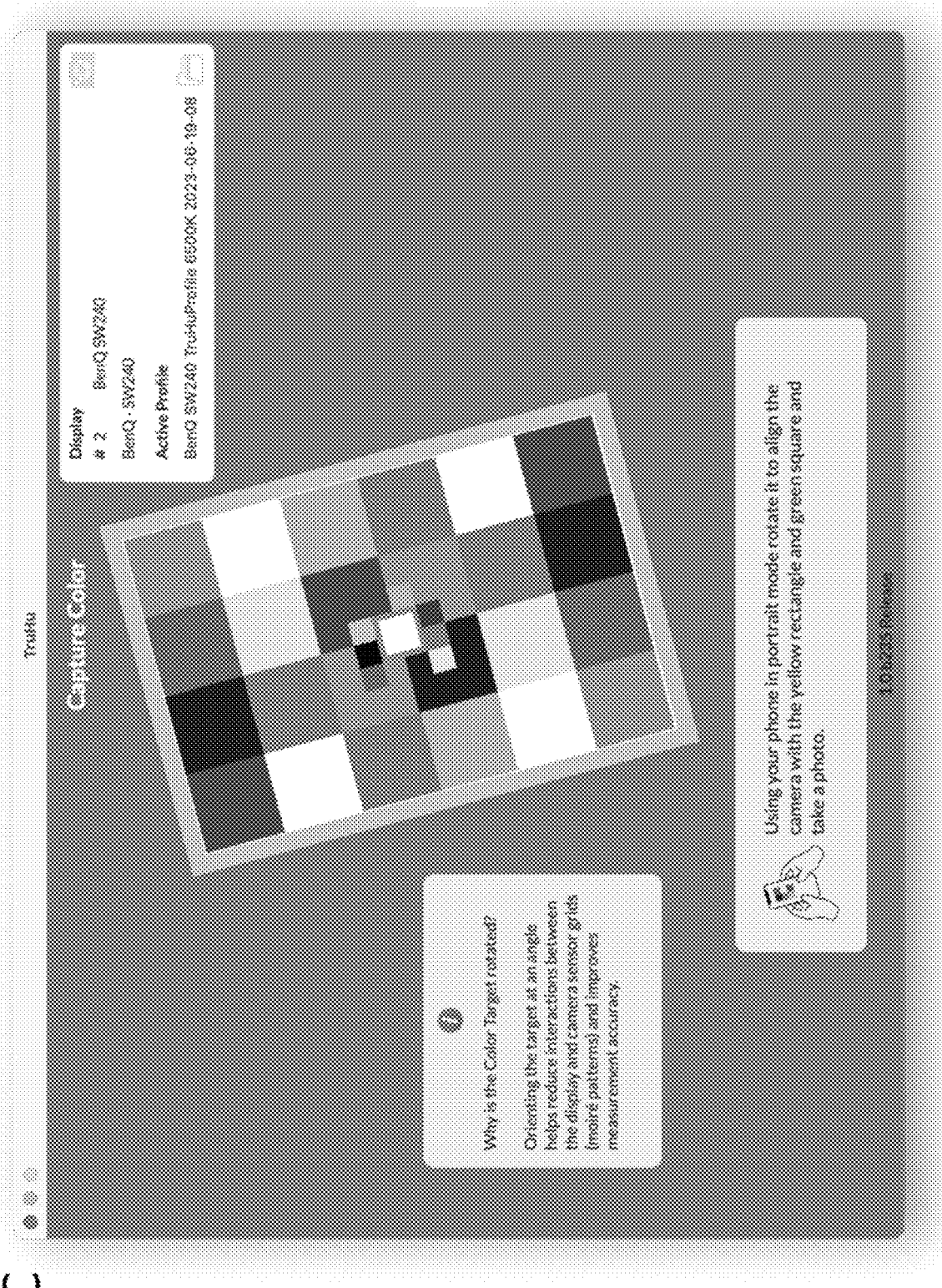
Figure 1D:
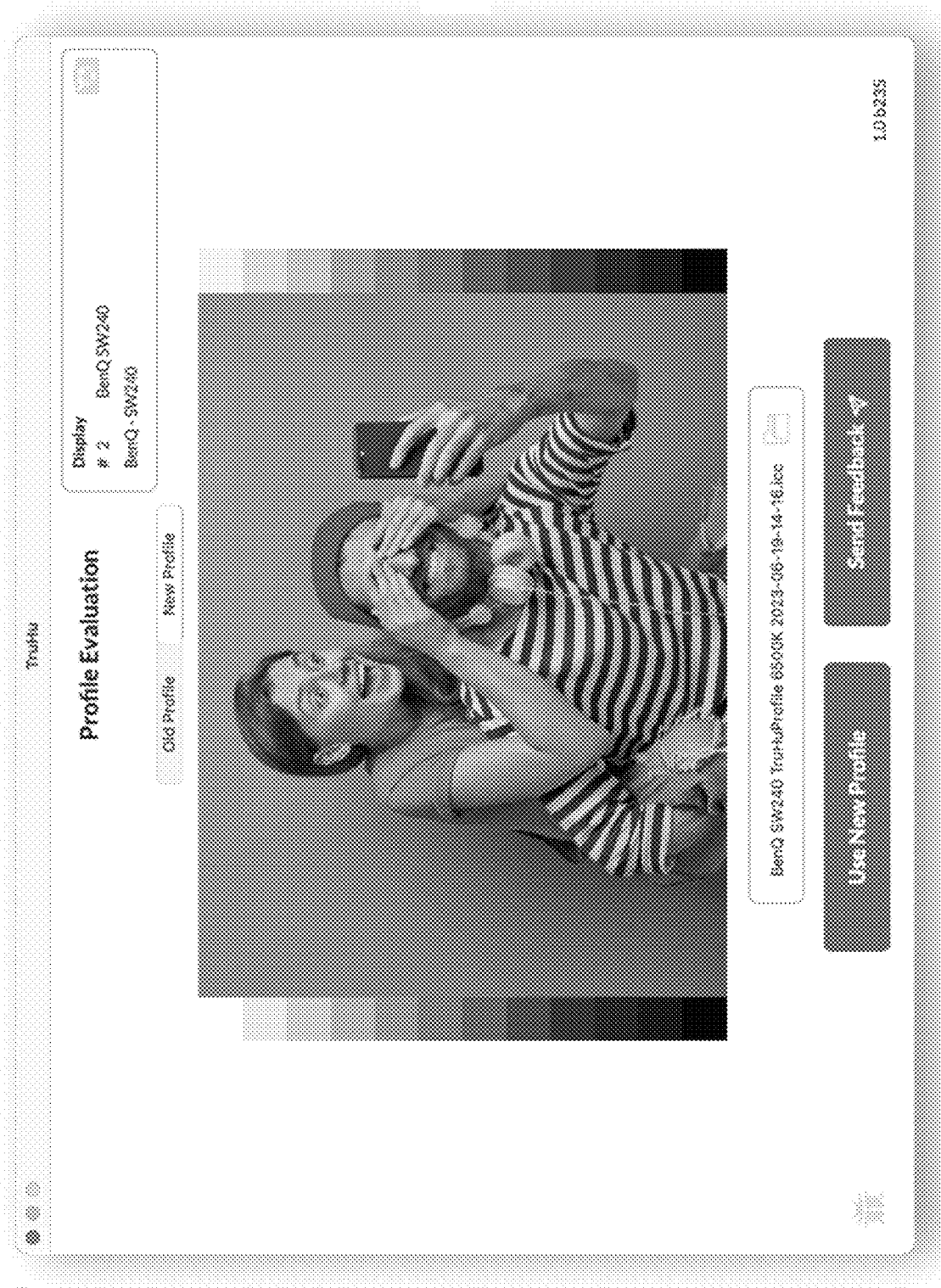
Figure 1E:
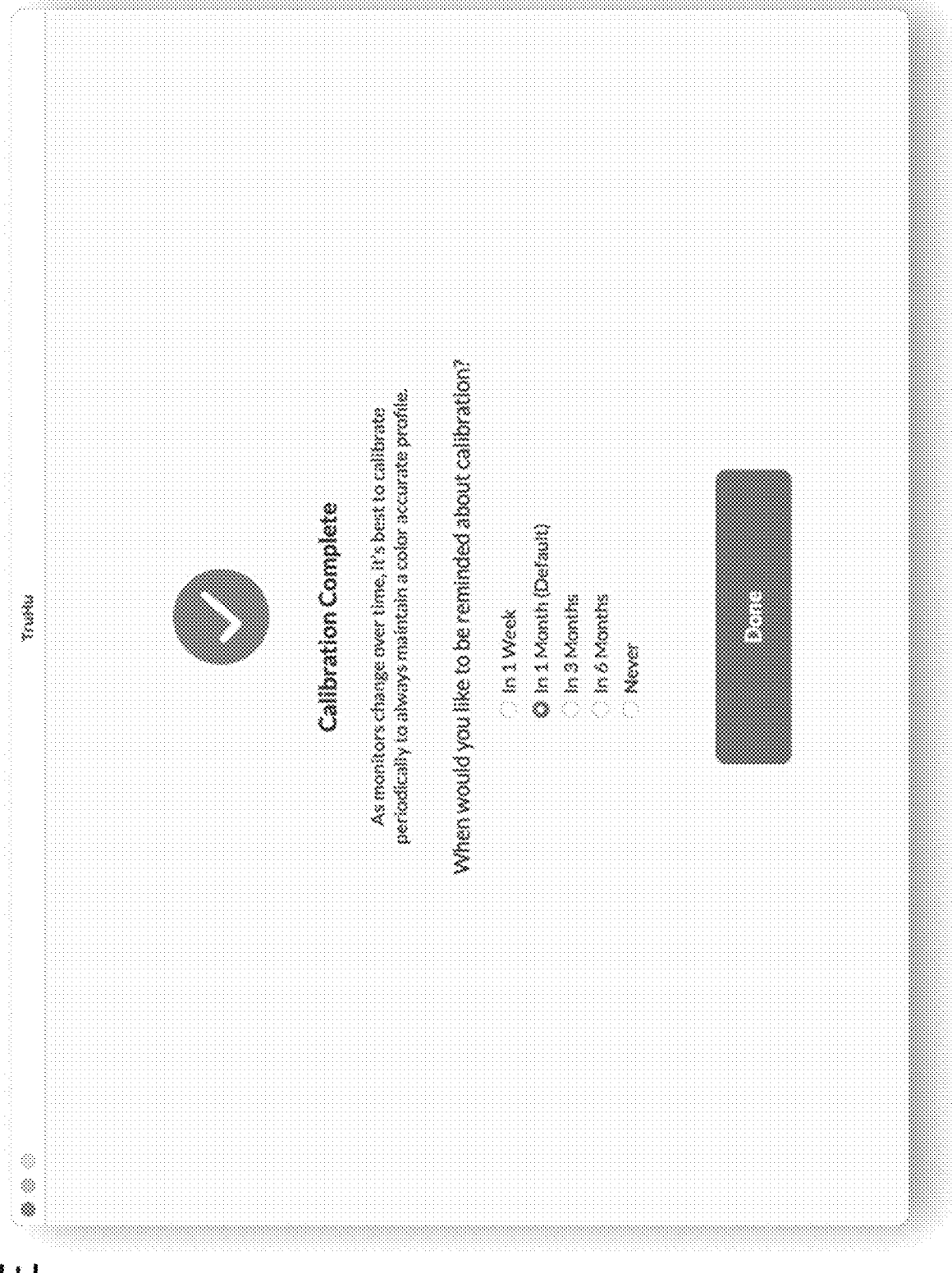
Figure 2A:
FIGS. 2A-G illustrate screen captures of a mobile phone application executing on a mobile phone showing the user experience during the desktop monitor calibration process.
Figure 2A:
Figure 2A:
Figure 2B:
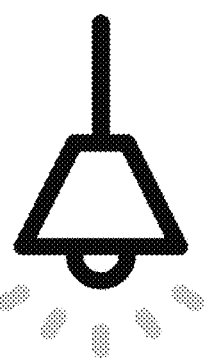
Figure 2C:
Figure 2C:
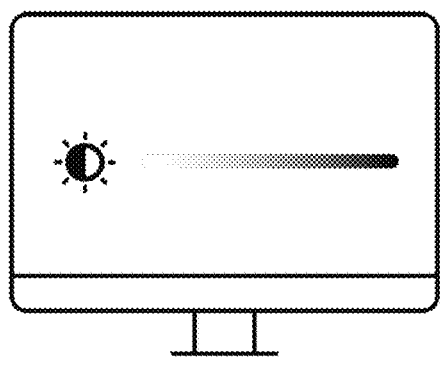
Figure 2C:
Figure 2D:
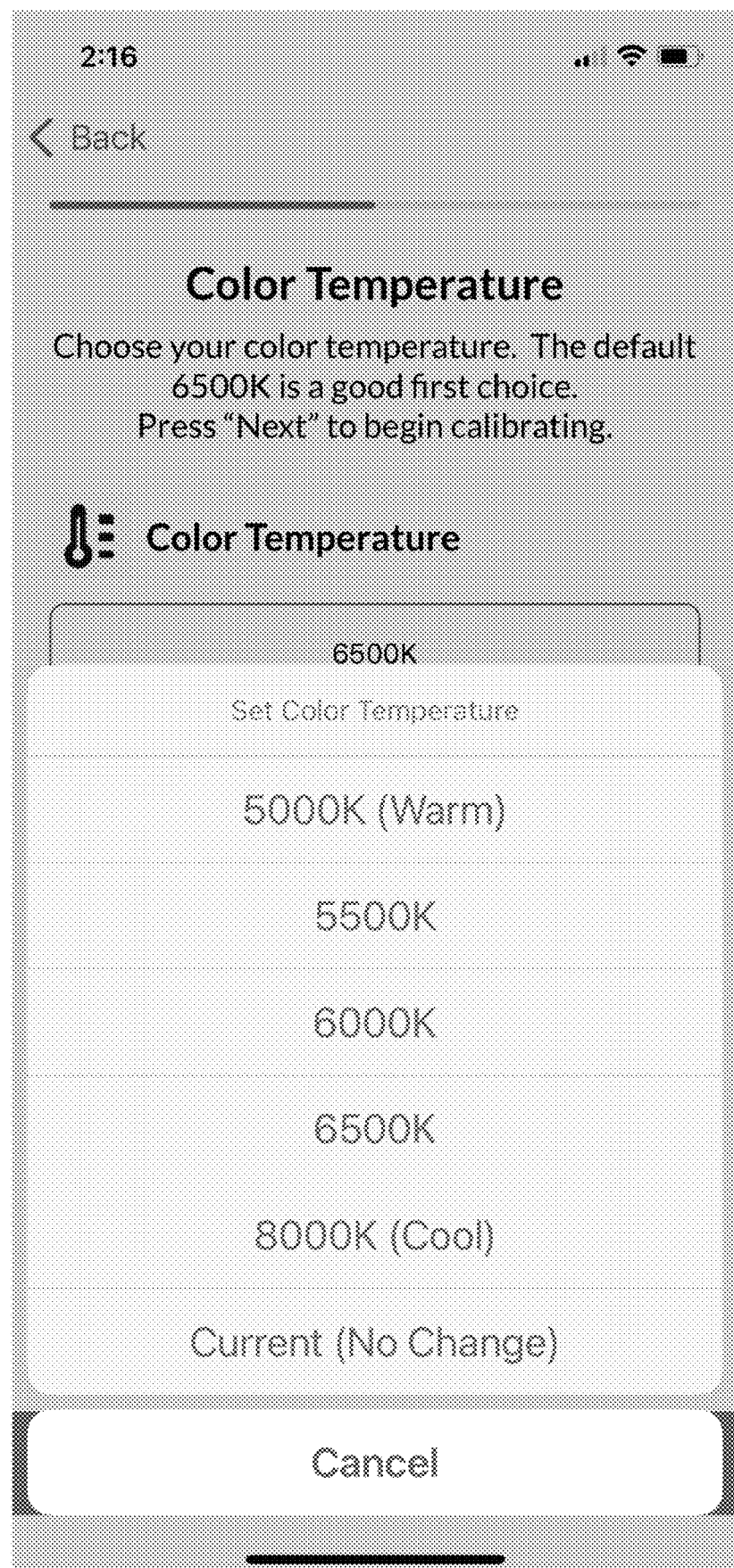
Figure 2E:
Figure 2E:
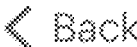
Figure 2E:
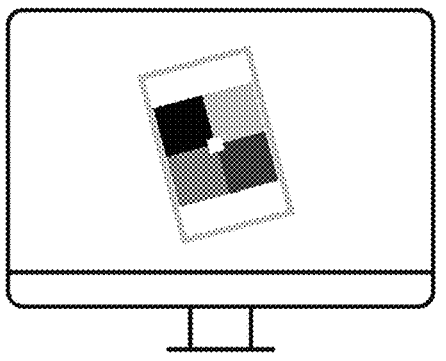
Figure 2E:
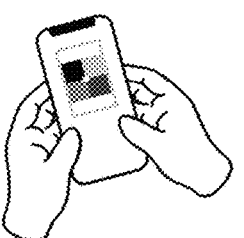
Figure 2F:
Figure 2F:
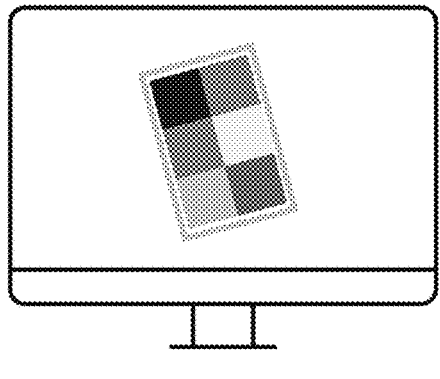
Figure 2F:
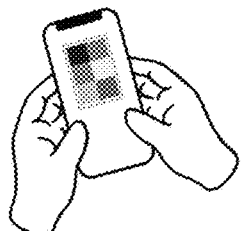
Figure 2G:
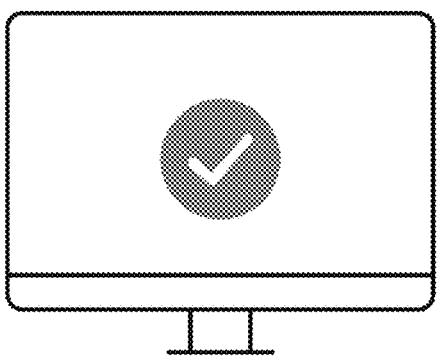

In the following description, references are made to various embodiments in accordance with which the disclosed subject matter can be practiced. Some embodiments may be described using the expressions one/an/another embodiment or the like, multiple instances of which do not necessarily refer to the same embodiment. Particular features, structures or characteristics associated with such instances can be combined in any suitable manner in various embodiments unless otherwise noted. By way of example, this disclosure may set out a set or list of a number of options or possibilities for an embodiment, and in such case, this disclosure specifically contemplates all clearly feasible combinations and/or permutations of items in the set or list.

Truhu™ Commercial Embodiment

The disclosed system can be configured to leverage a determined metamerism correction profile between individual displays (e.g. brand and model or backlight technology) and individual camera sensors (e.g. device brand and model, or image capture device technology, or brand and model). The metamerism correction profile for each combination of display and camera can be determined by testing and addresses metameric failure for the particular combination. For each calibration instance, the display and camera sensor are each identified, an associated metamerism correction profile is then retrieved from a metamerism correction matrix (MCM), and the metamerism correction profile is used to account for the particular combination of the camera and display when creating an ICC profile for installation on the display's computer. The disclosed system will now be described with reference to a commercial embodiment known as TruHu™.

FIGS. 1A-E illustrate screen captures of the TruHu desktop application executing on a desktop computer showing a user experience during a desktop monitor color calibration process.

FIGS. 2A-G illustrate screen captures of the TruHu mobile phone application executing on a mobile phone showing the user experience during the desktop monitor calibration process.

TruHu leverages the aforementioned MCM to transform RGB values encoded in a camera's RAW DNG capture to CIE-XYZ values, in essence turning the iPhone into a colorimeter for a specific backlight. Since different cameras use different sensors, each camera requires its own profile. Since there is risk for metameric failure between the camera sensor and a given backlight technology, each sensor/backlight pair requires a distinct camera profile. Different monitors have different panels with different spectra. Common colorimeters have calibration matrices for different backlight technologies. TruHu follows this concept by encoding these transformations in ICC profiles based on the monitor's backlight.

TruHu employs an exhaustive monitor database to determine the associated backlight for each detected display. In addition, for each backlight display, a separate profile can be created for each of a plurality of different sensors (cameras) to be supported. Accordingly, the TruHu system can be configured to access a database of profiles and retrieve a profile for a particular combination of phone (and/or camera) and backlight (and/or monitor) based on the particular sensor used in the phone and the backlight technology of the display to be calibrated.

A series of gray and RGB color patches are displayed on the monitor, captured by the smartphone in RAW format, sent to the computer, and converted to XYZ through the selected smartphone profile. This XYZ value is then used in the calibration module to make changes to the monitor's video lookup Tables. This process achieves a specific color temperature and tonality.

After the calibration is finished, the captured chromaticities (XYZ values of Red, Green, Blue patches), in combination with the previously set white point and tonality, are used to create an ICC profile. This ICC profile is registered with the computer system to make it the active monitor profile.

Starting with the iPhone 7 it is possible to capture RAW data as a DNG file. That is a standard file format defined by Adobe (see www.adobe.com/content/dam/acom/en/products/photoshop/pdfs/dng_spec_1.4.0.0.pdf). There are several ways to interpret a DNG, and a common one is with the open source C file dRAW.c. LibRAW (libRAW.com) maintains the code now and also supplies free C libraries for including in custom applications.

Today the most common applications to use RAW data are Adobe Photoshop and Lightroom, both of which use Adobe Camera RAW (ACR) for the import of RAW images. In order to "develop" these RAW images, a color profile has to be used. It converts RGB into the device independent color space CIE-XYZ. ACR uses Digital Camera Profiles (DCP), which are defined as part the DNG standard. There is no open source color engine that interprets and converts RGB using DCP profiles, so TruHu uses an ICC input profile from the RGB data retrieved from the DNG.

After communication between the iPhone and the computer has been established, TruHu displays a few color patches, starting with white. The iPhone will have to be positioned in front of the patch, preferably with as little light as possible reflecting into the iPhone camera. The user is presented a variety of choices for target white point (5000K, 5000K, 6000K, 6500K-default, 8000K, No Change/Current). The tonal behavior is set to sRGB curve (similar to a Gamma of 2.2)

Figure 3:
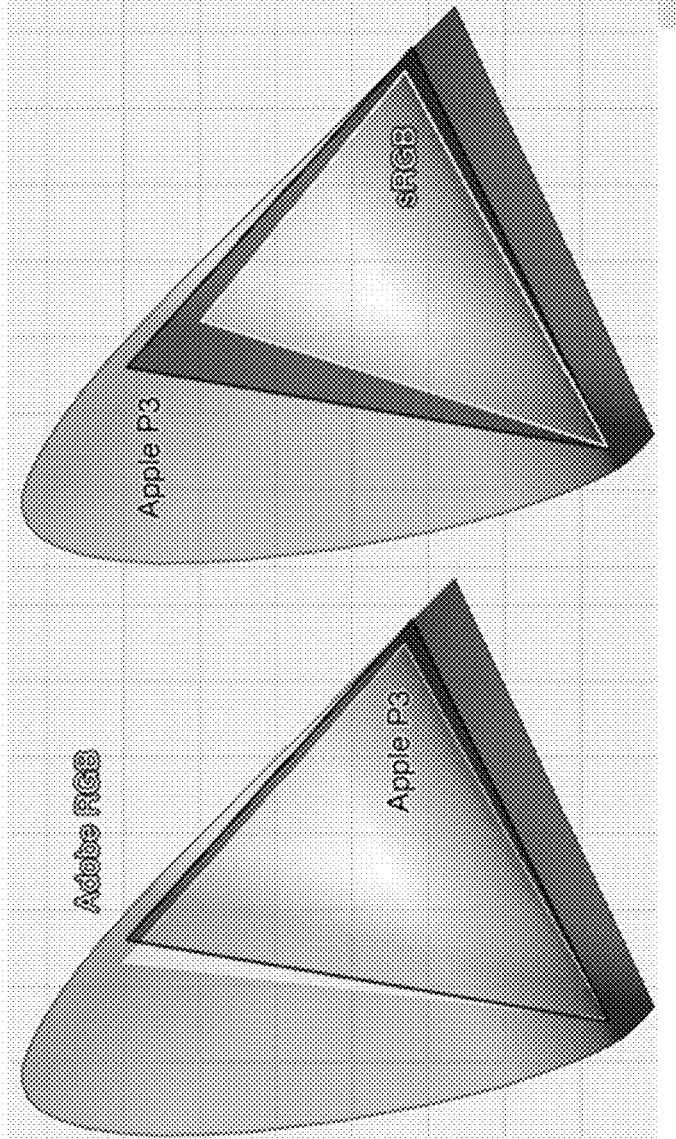
FIG. 3 illustrates the Adobe RGB, Apple P3, and sRGB color spaces.

With respect to color space, sRGB has been and still is the most common standard on the Internet. The sRGB space is what most cameras will produce, and what most laptops and computer monitors used to contain. Apple has started to use Display-P3, with all iOS devices since the iPhone 7 and Apple-branded computer displays. As shown in FIG. 3, Display-P3 has a similar size to Adobe RGB, but with a shift of the red and green primaries. Samsung and others have followed suit with their high end mobile phones, so the future standard for displays will most likely be P3 (see en.wikipedia.org/wiki/DCI-P3).

With respect to brightness, TruHu encourages users to minimize the amount of light falling on their display. They are then instructed to adjust the brightness to a level that creates a comfortable viewing environment (contrast between display and ambient luminance).

With respect to color temperature, 6500 Kelvin is the default color temperature setting for TruHu. It is the most commonly used color temperature on the internet, and is the white point of both sRGB and Display P3. However, some users (e.g., graphic artists) may prefer a warmer/yellower white, which is why TruHu enables warmers color temperatures such as 5000 Kelvin. Other users (e.g., videographers) may prefer a cooler/bluer white, so TruHu also offers a 8000 Kelvin white point target.

With respect to tonality, the gradation from black to white follows different formulae for different visual standards. sRGB uses an exponential curve (called Gamma) of 2.2 with the exception of the near black area, P3 mostly uses a Gamma of 2.6. The term Gamma comes from cathode ray tubes (CRTs), which had a very non-linear behavior. Modern displays are very linear, but unfortunately the Gamma has not disappeared. If an application uses color management including profiles the Gamma doesn't really matter except at the very dark end, e.g. for photos with a lot of shadow detail in the blacks. TruHu uses a 2.2 gamma.

To perform the calibration process, the video lookup tables in the graphics card get set to the desired gamma with the end points being at maximum. Then a white patch is displayed and "measured" with the iPhone. A square from the center of the DNG will be averaged to obtain a single RGB value that gets translated to XYZ using the camera profile. Based on the luminance—the Y value in XYZ—and on the color temperature—XYZ gets converted to xyY and then to Kelvin—the end points of Video Luts get modified, e.g. if the display is too blue the blue channel gets reduced. A short iteration will yield the desired white, after that we measure a grayscale, e.g. 4 more grays in steps of 25%. When the black patch has been measured, TruHu calculates the desired gamma and modifies the Video LUTs to achieve the final look.

$$D65=XYZ\ 95.047,100,108.883=xyY\ 0.3127,0.3290, \quad 1.$$

x and y are called chromaticities, they represent the color coordinates in the CIE shoe sole in FIG. 3.

TruHu performs a profiling process, which will now be described. After the grayscale, a red, a green and a blue color patch are displayed and measured. From the white and the color measurements a matrix is computed which characterizes the behavior of this display with this calibration. From this matrix a standard ICC profile gets generated, the Video LUTs become the 'vcgt' tag. This profile is then registered with the system to become the system monitor profile for this display.

Figure 4:
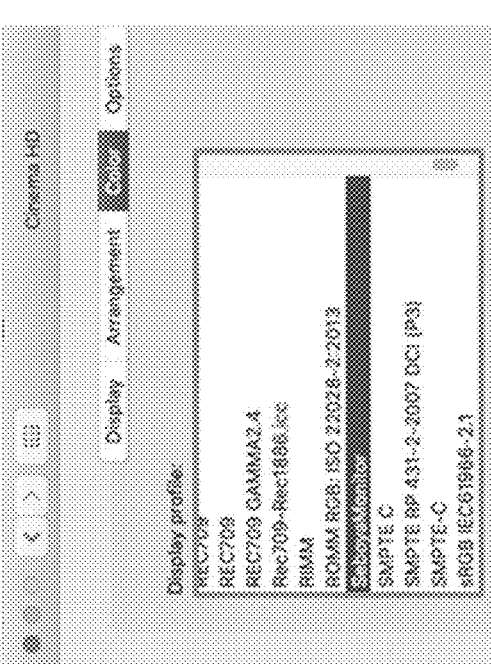
FIG. 4 illustrates a screenshot of a display profile being selected in a user interface of a desktop computer.

FIG. 4 illustrates a screenshot of a display profile being selected in a user interface of a desktop computer.

TruHu first creates what we call an "unlimited" profile, that becomes the basis for the final profile. TruHu looks in the stored monitor database for available information about the monitor. Often there is an entry that describes the color gamut of the monitor, e.g. AdobeRGB 95%, or sRGB 115%. Truhu also finds the factory profile for the connected monitor and calculates the volume of the gamut in Lab units. Based on that or based on the monitor info Truhu decides if this monitor is a wide gamut monitor or not. For wide gamut monitors a different camera profile is used, one that was created from a wide gamut monitor.

The other essential information in the monitor database is the backlight of the monitor. TruHu uses different camera profiles for different backlights, e.g. W-LED, GBr-LED, or CCFL. This way the color transformation which is optimized for the specific backlight is used. This approach is equivalent to a colorimeter having different calibrations depending on the backlight. In one embodiment, metamerism correction profiles are created for each of multiple possible backlight technologies, but not for each individual display (e.g. brand and model). In another embodiment, metamerism correction profiles are created for each individual backlight product used in a display and/or each individual display (e.g. by brand and model) in order to achieve a potentially more accurate result.

The final step is to analyze the differences between Truhu's unlimited profile and the factory profile and use a guardrail approach to limit the deviation from the factory profile. The guardrail approach prevents the profile's chromaticities from differing too far from the factory profile, so if the user takes "bad" measurements (e.g., too much light falling on the computer screen), TruHu will still produce a usable profile.

This profile is stored in a hidden temporary folder, and can be switched back to the previous one instantly when leaving the full screen mode.

After the calibration and profiling process, we now have a consistent and accurate display, no matter what the display was set to before.

Figure 5B:
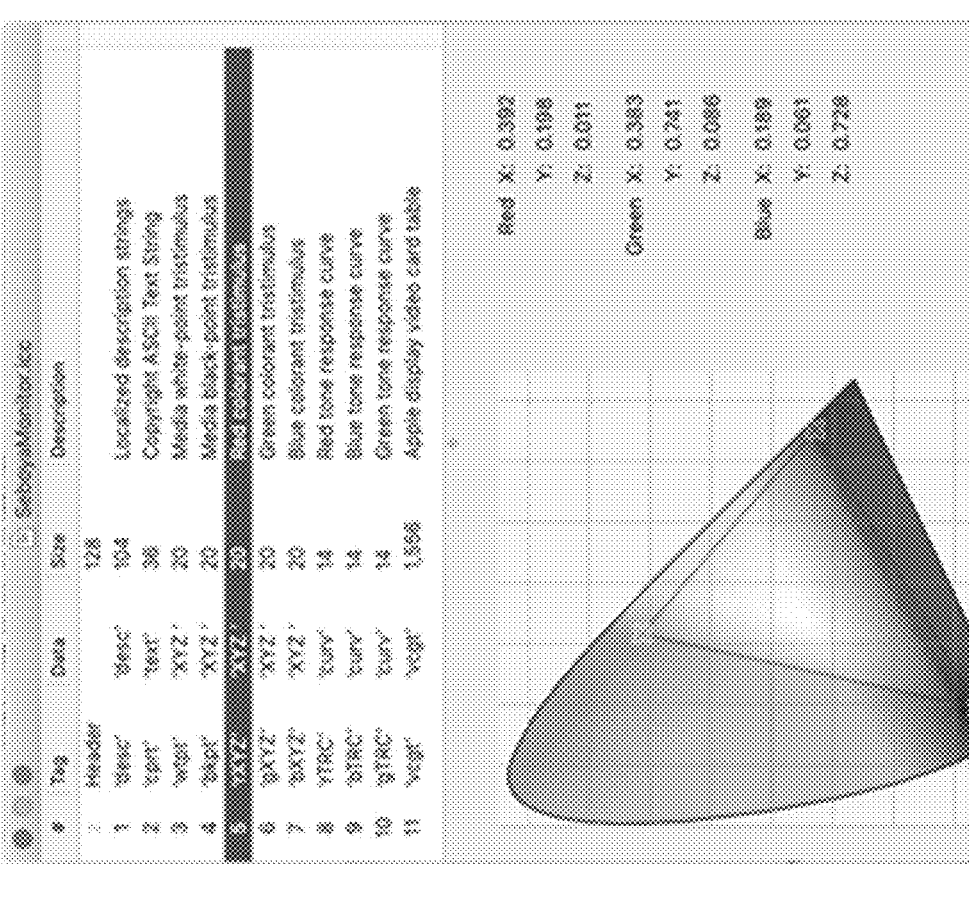
FIGS. 5A-B illustrate a user interface screenshot showing different aspects of an ICC profile.
Figure 5A:
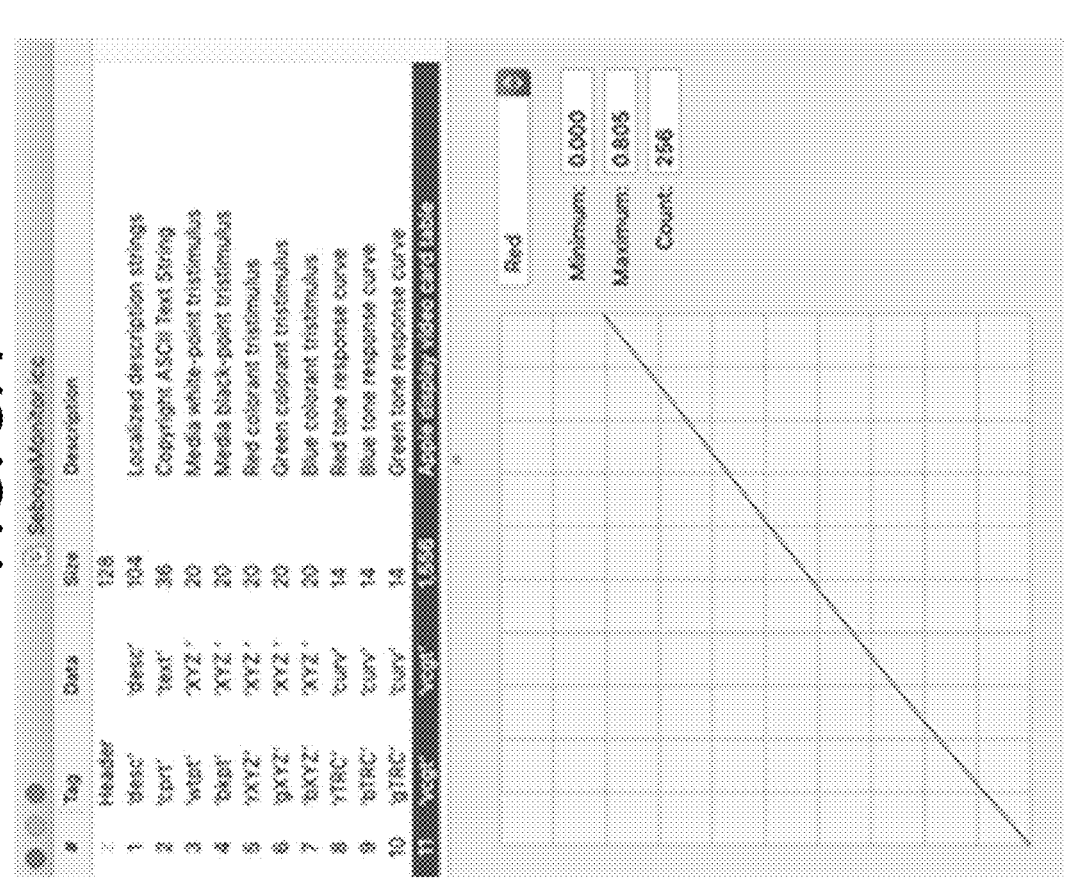

FIGS. 5A-B illustrate a user interface screenshot showing different aspects of an ICC profile.

Process Steps in Accordance with One Embodiment:

set default Video LUTs display white patch on monitor capture iPhone DNG->RGB value convert RGB to XYZ XYZ->new RGB value for end points of Video|LUTs set new Video LUTs repeat until XYZ value is close enough to target XYZ value display and measure grayscale once black is measured compute new tonal curve for final Video LUTs set new Video LUTs display and measure red, green, blue compute ICC profile set ICC profile as system profile Novel Features:

Controlling the Desktop with the iPhone/Web Sockets

The monitor database for determining backlight

The camera profiles for each backlight technology addresses metameric failure between the camera and the monitor.

Each display is examined 1) via the monitor database and 2) via factory profile to determine if it's "low gamut" or "wide" gamut. This is used to determine which camera profile to use.

Guardrails.

References factory profile

RGB chromaticity variation limits vs Factory profile

Hue—3 degrees in either direction

Chroma—10% up/0% down

Lightness—10% up or down

Angle the camera ~15 degrees to reduce moire

Computer Implementation

Components of the embodiments disclosed herein, which may be referred to as methods, processes, applications, programs, modules, engines, functions, or the like, can be implemented by configuring one or more computers or computer systems using special purpose software embodied as instructions on a non-transitory computer readable medium. The one or more computers or computer systems can be or include one or more standalone, client and/or server computers, which can be optionally networked through wired and/or wireless networks as a networked computer system.

The special purpose software can include one or more instances thereof, each of which can include, for example, one or more of client software, server software, desktop application software, app software, database software, operating system software, and driver software. Client software can be configured to operate a system as a client that sends requests for and receives information from one or more servers and/or databases. Server software can be configured to operate a system as one or more servers that receive requests for and send information to one or more clients. desktop application software and/or app software can operate a desktop application or app on desktop and/or portable computers. Database software can be configured to operate one or more databases on a system to store data and/or information and respond to requests by client software to retrieve, store, and/or update data. Operating system software and driver software can be configured to provide an operating system as a platform and/or drivers as interfaces to hardware or processes for use by other software of a computer or computer system. By way of example, any data created, used, or operated upon by the embodiments disclosed herein can be stored in, accessed from, and/or modified in a database operating on a computer system.

Figure 6:
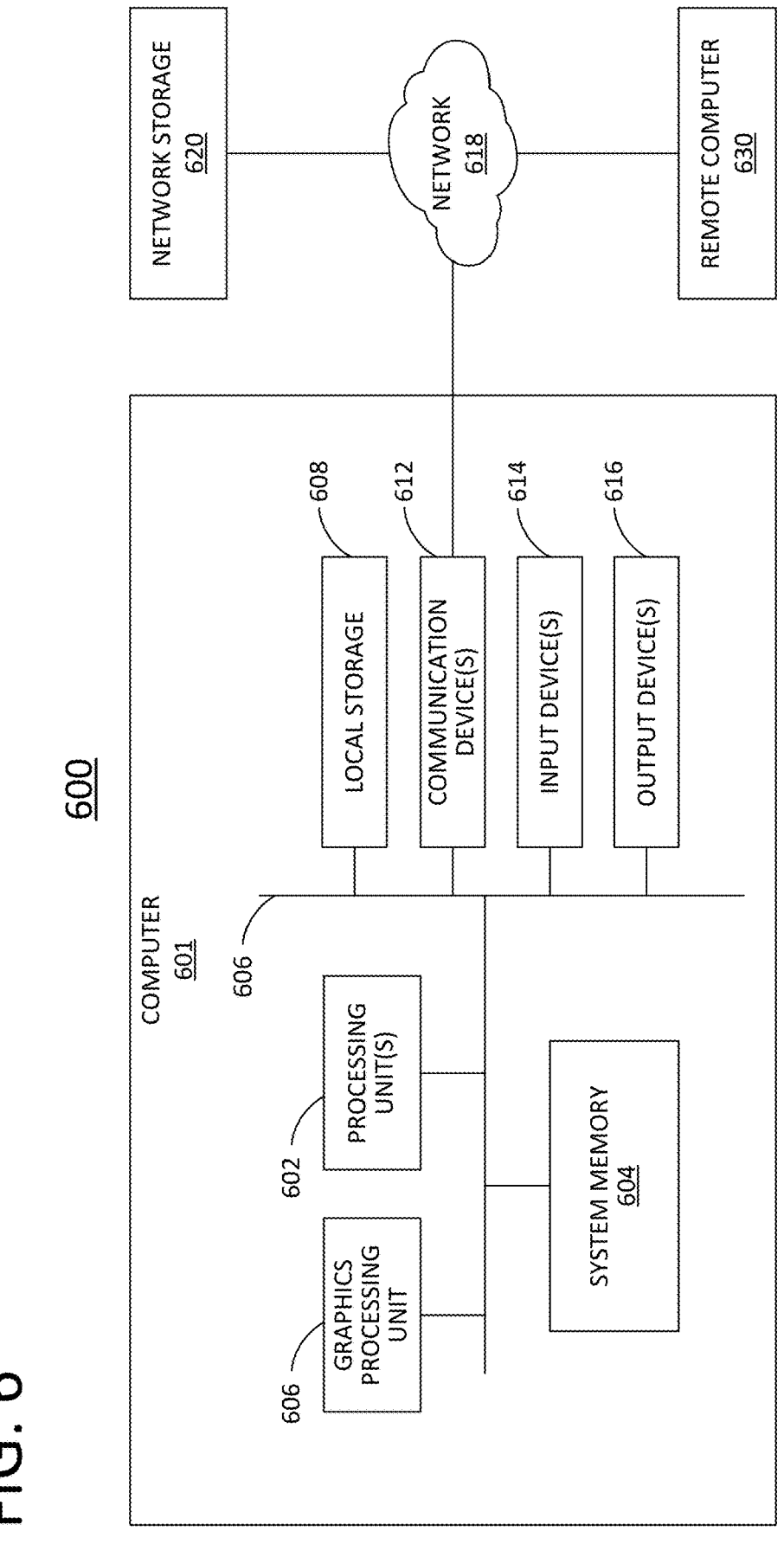
FIG. 6 illustrates a general computer architecture that can be appropriately configured to implement components disclosed in accordance with various embodiments.

FIG. 6 illustrates a general computer architecture 600 that can be appropriately configured to implement components disclosed in accordance with various embodiments. The computing architecture 600 can include various common computing elements, such as a computer 601, a network 618, and one or more remote computers 630. The embodiments disclosed herein, however, are not limited to implementation by the general computing architecture 600.

Referring to FIG. 6, the computer 601 can be any of a variety of general purpose computers such as, for example, a server, a desktop computer, a laptop computer, a tablet computer, or a mobile computing device. The computer 601 can include a processing unit 602, a system memory 604 and a system bus 606.

The processing unit 602 can be or include one or more of any of various commercially available computer processors, which can each include one or more processing cores that can operate independently of each other. Additional co-processing units, such as a graphics processing unit 603, can also be present in the computer.

The system memory 604 can include volatile devices, such as dynamic random access memory (DRAM) or other random access memory devices. The system memory 604 can also or alternatively include non-volatile devices, such as a read-only memory or flash memory.

The computer 601 can include local non-volatile secondary storage 608 such as a disk drive, solid state disk, or removable memory card. The local storage 608 can include one or more removable and/or non-removable storage units. The local storage 608 can be used to store an operating system that initiates and manages various applications that execute on the computer. The local storage 608 can also be used to store special purpose software configured to implement the components of the embodiments disclosed herein and that can be executed as one or more applications under the operating system.

The computer 601 can also include communication device(s) 612 through which the computer communicates with other devices, such as one or more remote computers 630, over wired and/or wireless computer networks 618. Communications device(s) 612 can include, for example, a network interface for communicating data over a wired computer network. The communication device(s) 612 can include, for example, one or more radio transmitters for communications over Wi-Fi, Bluetooth, and/or mobile telephone networks.

The computer 601 can also access network storage 620 through the computer network 618. The network storage can include, for example, a network attached storage device located on a local network, or cloud-based storage hosted at one or more remote data centers. The operating system and/or special purpose software can alternatively be stored in the network storage 620.

The computer 601 can have various input device(s) 614 such as a keyboard, mouse, touchscreen, camera, microphone, accelerometer, thermometer, magnetometer, or any other sensor. Output device(s) 616 such as a display, speakers, printer, or eccentric rotating mass vibration motor can also be included.

The various storage 608, communication device(s) 612, output device(s) 616 and input device(s) 614 can be integrated within a housing of the computer or can be connected through various input/output interface devices on the computer, in which case the reference numbers 608, 612, 614 and 616 can indicate either the interface for connection to a device or the device itself as the case may be.

Any of the foregoing aspects may be embodied in one or more instances as a computer system, as a process performed by such a computer system, as any individual component of such a computer system, or as an article of manufacture including computer storage in which computer program instructions are stored and which, when processed by one or more computers, configure the one or more computers to provide such a computer system or any individual component of such a computer system. A server, computer server, a host or a client device can each be embodied as a computer or a computer system. A computer system may be practiced in distributed computing environments where operations are performed by multiple computers that are linked through a communications network. In a distributed computing environment, computer programs can be located in both local and remote computer storage media.

Each component of a computer system such as described herein, and which operates on one or more computers, can be implemented using the one or more processing units of the computer and one or more computer programs processed by the one or more processing units. A computer program includes computer-executable instructions and/or computer-interpreted instructions, such as program modules, which instructions are processed by one or more processing units in the computer. Generally, such instructions define routines, programs, objects, components, data structures, and so on, that, when processed by a processing unit, instruct the processing unit to perform operations on data or configure the processor or computer to implement various components or data structures.

Components of the embodiments disclosed herein, which may be referred to as modules, engines, processes, functions, or the like, can be implemented in hardware, such as by using special purpose hardware logic components, by configuring general purpose computing resources using special purpose software, or by a combination of special purpose hardware and configured general purpose computing resources. Illustrative types of hardware logic components that can be used include, for example, Field-programmable Gate Arrays (FPGAs), Application-specific Integrated Circuits (ASICs), Application-specific Standard Products (AS-SPs), System-on-a-chip systems (SOCs), and Complex Programmable Logic Devices (CPLDs).

CONCLUSION

Although the subject matter has been described in terms of certain embodiments, other embodiments that may or may not provide various features and aspects set forth herein shall be understood to be contemplated by this disclosure. The specific embodiments set forth herein are disclosed as examples only, and the scope of the patented subject matter is defined by the claims that follow.

In the claims, the terms "based upon" and "based on" shall include situations in which a factor is taken into account directly and/or indirectly, and possibly in conjunction with other factors, in producing a result or effect. In the claims, a portion shall include greater than none and up to the whole of a thing. In method claims, any reference characters are used for convenience of description only, and do not indicate a particular order for performing a method.

The invention claimed is:

1. A method performed by a system comprising a desktop computer with a display and a mobile device with a camera, the method comprising:

establishing a network connection between a mobile device application executing on the mobile device and a desktop application executing on the desktop computer;

identifying a display feature of the display comprising a backlight technology or display model;

identifying a camera feature of the camera comprising a camera model or a mobile device model;

retrieving a metamerism correction profile based on the display feature and the camera feature;

the mobile device using the camera to capture one or more images of one or more test patterns displayed on the display; and performing a monitor profiling process to adjust color calibration of the display based on the metamerism correction profile and the captured images, wherein the monitor profiling process comprises:

adjusting a white point or color temperature setting;

adjusting a tonal reproduction curve; and installing an ICC monitor profile.

2. The method of claim 1, wherein the one or more images are captured in RAW format.

3. The method of claim 1, wherein the white point or color temperature setting is further based on user input.

* * * * *